United States Patent
Villar et al.

(10) Patent No.: US 10,518,188 B2
(45) Date of Patent: Dec. 31, 2019

(54) CONTROLLING PHYSICAL TOYS USING A PHYSICS ENGINE

(71) Applicant: Microsoft Technology Licensing, LLC, Redmond, WA (US)

(72) Inventors: Nicolas Villar, Cambridge (GB); James William Scott, Cambridge (GB); Haiyan Zhang, London (GB); Alexandra Keeley Bunting, London (GB)

(73) Assignee: Microsoft Technology Licensing, LLC, Redmond, WA (US)

( * ) Notice: Subject to any disclaimer, the term of this patent is extended or adjusted under 35 U.S.C. 154(b) by 0 days.

(21) Appl. No.: 14/320,399

(22) Filed: Jun. 30, 2014

(65) Prior Publication Data

US 2015/0375128 A1    Dec. 31, 2015

(51) Int. Cl.
*G06F 3/01* (2006.01)
*A63H 30/02* (2006.01)
(Continued)

(52) U.S. Cl.
CPC ........... *A63H 30/02* (2013.01); *A63F 13/245* (2014.09); *A63F 13/25* (2014.09); *A63F 13/28* (2014.09);
(Continued)

(58) Field of Classification Search
CPC ........ G06F 3/011; G06F 3/048; A63F 13/211; A63F 13/213; A63F 13/216
See application file for complete search history.

(56) References Cited

U.S. PATENT DOCUMENTS

| 6,031,549 A | 2/2000 | Hayes-Roth |
| 6,149,490 A | 11/2000 | Hampton et al. |

(Continued)

FOREIGN PATENT DOCUMENTS

| CN | 1584838 A | 2/2005 |
| CN | 103096987 A | 5/2013 |

(Continued)

OTHER PUBLICATIONS

Schweikardt, Eric, "Designing Modular Robots", Nov. 19, 2013, Available at: http://www.cmu.edu/architecture/research/grad_work/2009_phdcd_schweikardt_eric.pdf.
(Continued)

*Primary Examiner* — James S. McClellan
*Assistant Examiner* — Kevin M Carter
(74) *Attorney, Agent, or Firm* — Ray Quinney & Nebeker P.C.; John O. Carpenter

(57) ABSTRACT

Methods and systems for controlling physical toys using a physics engine are described. In an embodiment, a physics engine within an interactive software experience is used to model the motion of a virtual object in a virtual environment. The output of this modelling is then imposed on a physical toy which corresponds to the virtual object such that the motion of the physical toy in the real world more closely matches the motion of the virtual object in the virtual environment. In various examples, the modelling is imposed through control signals which are generated based on output of the physics engine and used to control actuators within the physical toy to change the motion of at least a part of the toy.

21 Claims, 7 Drawing Sheets

(51) Int. Cl.
| | |
|---|---|
| *A63H 30/04* | (2006.01) |
| *A63F 13/25* | (2014.01) |
| *A63F 13/245* | (2014.01) |
| *A63F 13/28* | (2014.01) |
| *A63F 13/65* | (2014.01) |

(52) U.S. Cl.
CPC .............. *A63H 30/04* (2013.01); *A63F 13/65* (2014.09); *A63H 2200/00* (2013.01)

(56) References Cited

U.S. PATENT DOCUMENTS

| | | | |
|---|---|---|---|
| 6,159,101 A | 12/2000 | Simpson | |
| 6,290,565 B1 | 9/2001 | Galyean, III et al. | |
| 6,305,688 B1 | 10/2001 | Waroway | |
| 6,454,624 B1 | 9/2002 | Duff et al. | |
| 6,572,431 B1 | 6/2003 | Maa | |
| 6,575,802 B2 | 6/2003 | Yim et al. | |
| 6,629,591 B1 | 10/2003 | Griswold et al. | |
| 6,682,392 B2 | 1/2004 | Chan | |
| 6,773,322 B2 | 8/2004 | Gabai et al. | |
| 6,773,344 B2 | 8/2004 | Gabai et al. | |
| 6,877,096 B1 | 4/2005 | Chung et al. | |
| 6,923,717 B2 | 8/2005 | Mayer et al. | |
| 6,954,659 B2 | 10/2005 | Tushinsky et al. | |
| 7,154,363 B2 | 12/2006 | Hunts | |
| 7,403,202 B1 * | 7/2008 | Nash | G06T 7/2033 345/474 |
| 7,439,972 B2 | 10/2008 | Timcenko | |
| 7,641,476 B2 | 1/2010 | Didur et al. | |
| 7,695,338 B2 | 4/2010 | Dooley et al. | |
| 7,749,089 B1 | 6/2010 | Briggs et al. | |
| 8,058,837 B2 | 11/2011 | Beers et al. | |
| 8,079,846 B1 | 12/2011 | Cookson | |
| 8,087,939 B2 | 1/2012 | Rohrbach et al. | |
| 8,157,611 B2 | 4/2012 | Zheng | |
| 8,228,202 B2 | 7/2012 | Buchner et al. | |
| 8,257,157 B2 | 9/2012 | Polchin | |
| 8,317,566 B2 | 11/2012 | Ganz | |
| 8,332,544 B1 | 12/2012 | Ralls et al. | |
| 8,475,275 B2 | 7/2013 | Weston et al. | |
| 8,548,819 B2 | 10/2013 | Chan et al. | |
| 8,585,476 B2 | 11/2013 | Mullen | |
| 8,628,414 B2 | 1/2014 | Walker et al. | |
| 8,825,187 B1 | 9/2014 | Hamrick et al. | |
| 8,854,925 B1 | 10/2014 | Lee et al. | |
| 8,864,497 B1 * | 10/2014 | Pollak | 434/37 |
| 9,696,757 B2 | 7/2017 | Scott et al. | |
| 9,919,226 B2 | 3/2018 | Scott et al. | |
| 2002/0196250 A1 | 12/2002 | Anderson et al. | |
| 2003/0013524 A1 | 1/2003 | Cochran | |
| 2003/0030595 A1 | 2/2003 | Radley-Smith | |
| 2003/0232649 A1 * | 12/2003 | Gizis | A63F 13/12 463/40 |
| 2004/0053690 A1 | 3/2004 | Fogel et al. | |
| 2005/0049725 A1 * | 3/2005 | Huang | A63H 3/52 700/19 |
| 2005/0132290 A1 | 6/2005 | Buchner et al. | |
| 2005/0227811 A1 | 10/2005 | Shum et al. | |
| 2005/0245302 A1 * | 11/2005 | Bathiche | A63F 13/00 463/1 |
| 2005/0255916 A1 | 11/2005 | Chen | |
| 2006/0058018 A1 | 3/2006 | Toulis et al. | |
| 2006/0223637 A1 * | 10/2006 | Rosenberg | A63F 13/10 463/47 |
| 2007/0097832 A1 | 5/2007 | Koivisto et al. | |
| 2007/0155505 A1 | 7/2007 | Huomo | |
| 2007/0198117 A1 | 8/2007 | Wajihuddin | |
| 2007/0218988 A1 | 9/2007 | Lucich | |
| 2007/0279852 A1 | 12/2007 | Daniel et al. | |
| 2007/0293319 A1 | 12/2007 | Stamper et al. | |
| 2008/0014835 A1 | 1/2008 | Weston et al. | |
| 2008/0045283 A1 | 2/2008 | Stamper et al. | |
| 2008/0076519 A1 | 3/2008 | Chim | |
| 2008/0153559 A1 | 6/2008 | De Weerd | |
| 2008/0280684 A1 | 11/2008 | McBride et al. | |
| 2009/0008875 A1 | 1/2009 | Wu et al. | |
| 2009/0029771 A1 | 1/2009 | Donahue | |
| 2009/0047865 A1 | 2/2009 | Nakano | |
| 2009/0048009 A1 | 2/2009 | Brekelmans et al. | |
| 2009/0053970 A1 | 2/2009 | Borge | |
| 2009/0081923 A1 | 3/2009 | Dooley et al. | |
| 2009/0082879 A1 | 3/2009 | Dooley et al. | |
| 2009/0094287 A1 | 4/2009 | Johnson et al. | |
| 2009/0104988 A1 | 4/2009 | Enge et al. | |
| 2009/0206548 A1 | 8/2009 | Hawkins et al. | |
| 2009/0251419 A1 | 10/2009 | Radely-Smith | |
| 2009/0265642 A1 | 10/2009 | Carter et al. | |
| 2009/0291764 A1 | 11/2009 | Kirkman et al. | |
| 2009/0307592 A1 | 12/2009 | Kalanithi et al. | |
| 2009/0315839 A1 | 12/2009 | Wilson et al. | |
| 2010/0009747 A1 | 1/2010 | Reville et al. | |
| 2010/0026698 A1 | 2/2010 | Reville et al. | |
| 2010/0035726 A1 | 2/2010 | Fisher et al. | |
| 2010/0103075 A1 | 4/2010 | Kalaboukis et al. | |
| 2010/0113148 A1 | 5/2010 | Haltovsky et al. | |
| 2010/0144436 A1 | 6/2010 | Marks et al. | |
| 2010/0167623 A1 | 7/2010 | Eyzaguirre et al. | |
| 2010/0274902 A1 * | 10/2010 | Penman | A63F 13/12 709/227 |
| 2010/0279823 A1 | 11/2010 | Waters | |
| 2011/0021109 A1 | 1/2011 | Le et al. | |
| 2011/0028219 A1 | 2/2011 | Heatherly et al. | |
| 2011/0172015 A1 | 7/2011 | Ikeda et al. | |
| 2011/0239143 A1 | 9/2011 | Ye et al. | |
| 2012/0007817 A1 | 1/2012 | Heatherly et al. | |
| 2012/0050198 A1 | 3/2012 | Cannon | |
| 2012/0052931 A1 | 3/2012 | Jaqua et al. | |
| 2012/0052934 A1 | 3/2012 | Maharbiz et al. | |
| 2012/0084467 A1 * | 4/2012 | Birnbaum | G06F 3/016 710/16 |
| 2012/0122059 A1 | 5/2012 | Schweikardt et al. | |
| 2012/0190453 A1 | 7/2012 | Skaff et al. | |
| 2012/0268360 A1 | 10/2012 | Mikhailov | |
| 2012/0286629 A1 | 11/2012 | Johnson et al. | |
| 2012/0295700 A1 | 11/2012 | Reiche | |
| 2012/0295704 A1 | 11/2012 | Reiche et al. | |
| 2013/0109267 A1 | 5/2013 | Schweikardt et al. | |
| 2013/0109272 A1 | 5/2013 | Rindlisbacher | |
| 2013/0122753 A1 | 5/2013 | Blakborn | |
| 2013/0165223 A1 | 6/2013 | Leyland et al. | |
| 2013/0173658 A1 | 7/2013 | Adelman et al. | |
| 2013/0196766 A1 | 8/2013 | Leyland et al. | |
| 2013/0196770 A1 | 8/2013 | Barney et al. | |
| 2013/0231193 A1 | 9/2013 | Heatherly et al. | |
| 2013/0271390 A1 | 10/2013 | Lyons et al. | |
| 2013/0288563 A1 | 10/2013 | Zheng et al. | |
| 2013/0324239 A1 | 12/2013 | Ur et al. | |
| 2013/0324250 A1 * | 12/2013 | Sofman | A63H 30/04 463/31 |
| 2014/0002580 A1 | 1/2014 | Bear et al. | |
| 2014/0011595 A1 | 1/2014 | Muller | |
| 2014/0055352 A1 | 2/2014 | Davis et al. | |
| 2014/0141865 A1 | 5/2014 | Tropper et al. | |
| 2014/0213357 A1 | 7/2014 | Claffey | |
| 2014/0235198 A1 | 8/2014 | Lee et al. | |
| 2014/0235353 A1 | 8/2014 | Witchey | |
| 2014/0273717 A1 * | 9/2014 | Judkins | A63H 3/28 446/175 |
| 2015/0042619 A1 * | 2/2015 | Forti | G06F 3/0488 345/175 |
| 2015/0080121 A1 * | 3/2015 | Garlington | A63H 30/04 463/31 |
| 2015/0268717 A1 * | 9/2015 | Schlumberger | A63F 13/00 345/156 |
| 2016/0101361 A1 | 4/2016 | Scott et al. | |
| 2016/0101364 A1 | 4/2016 | Scott et al. | |
| 2016/0104321 A1 | 4/2016 | Scott et al. | |
| 2017/0232347 A1 | 8/2017 | Scott et al. | |

(56) References Cited

U.S. PATENT DOCUMENTS

FOREIGN PATENT DOCUMENTS

| CN | 103236720 A | 8/2013 |
|---|---|---|
| CN | 103530495 A | 1/2014 |
| CN | 203434701 U | 2/2014 |
| CN | 103999012 A | 8/2014 |
| JP | H09205733 A | 8/1997 |
| JP | 2003038842 A | 2/2003 |
| JP | 2013135374 A | 7/2013 |
| WO | 2001012285 A1 | 2/2001 |
| WO | 2001069799 A2 | 9/2001 |
| WO | 2001069829 A2 | 9/2001 |
| WO | 2009037679 A1 | 3/2009 |
| WO | 2012160055 A1 | 11/2012 |
| WO | WO 2012/162090 A2 | 11/2012 |
| WO | WO 2014/055924 A1 | 4/2014 |

OTHER PUBLICATIONS

"Skylanders Swapforce", Sep. 11, 2013, Available at: http://www.skylanders.com/swapforce.

"Disney Infinity", Nov. 19, 2013, Available at: https://infinity.disney.com/en-gb.

"Cubelets", Sep. 11, 2013, Available at: http://www.modrobotics.com/.

"Shapeways", Nov. 19, 2013, Available at: http://shapeways.com/.

Lampe, et al., "The Augmented Knight's Castle—Integrating Mobile and Pervasive Computing Technologies into Traditional Toy Environments", Nov. 21, 2013, Available at: http://www.vs.inf.ethz.ch/publ/papers/mlampe-pg07-akc.pdf.

Kikin-Gil, Ruth, "BuddyBeads", Published on: Oct. 10, 2006, Available at: http://www.ruthkikin.com/Images/r.kikin-gil_thesis2005.pdf.

Fortmann, et al., "Illumee: Aesthetic Light Bracelet as a Wearable Information Display for Everyday Life", In Proceedings of ACM Conference on Pervasive and Ubiquitous Computing Adjunct Publication, Sep. 8, 2013, 4 pages.

Labrune, et al., "Telebeads: Social Network Mnemonics for Teenagers", In Proceedings of Conference on Interaction Design and Children, Jun. 7, 2006, 8 pages.

Ahde, et al., "Hello—Bracelets Communicating Nearby Presence of Friends", In Proceedings of the Tenth Anniversary Conference on Participatory Design, Sep. 30, 2008, 3 pages.

Kuniavsky, Mike, "Smart Things: Ubiquitous Computing User Experience Design", Published on: Sep. 2010, Available at: http://books.google.co.in/books?id=-WLyUCBBUVAC&pg=PA89&lpg=PA89&dq=Interactive+Smart+Beads+and+Bracelet&source=bl&ots=HA6ZA1Bssz&sig=x1s2X1pGZIe-5oVqX3uZA0jZ1ks&hl=en&sa=X&ei=BxWLUqSGI4X3rQfh9oDYCg&ved=0CFAQ6AEwBg#v=onepage&q=Interactive%20Smart%20Beads%20and%20Bracelet&f=false.

Robertson, Judy, "Encouraging Girls to Study Geeky Subjects (Part 2): Programmable Bracelets", Published on: Apr. 12, 2010, Available at: http://cacm.acm.org/blogs/blog-cacm/85132-encouraging-girls-to-study-geeky-subjects-part-2-programmable-bracelets/fulltext.

Lampe, et al., "Integrating Interactive Learning Experiences into Augmented Toy Environments", In Proceedings of the Pervasive Learning Workshop at the Pervasive Conference, May 2007, 8 pages.

"Seebo Platform", Published on: Jun. 22, 2013, Available at: http://www.seebo.com/.

Raffle, et al., "Topobo: A Constructive Assembly System with Kinetic Memory", In Proceedings of the SIGCHI Conference on Human Factors in Computing Systems, Apr. 24, 2004.

Schmid, et al., "Networking Smart Toys with Wireless ToyBridge and ToyTalk", in IEEE International Conference on Computer Communications, Apr. 10, 2011, 2 pages.

Patrizia, et al., "A Robotic Toy for Children with special needs: From requirements to Design", In IEEE 11th International Conference on Rehabilitation Robotics, Nov. 20, 2013, 6 pages.

Zaino, Jennifer, "JNFC Technology Brings New Life to Games", In Journal of RFID, Oct. 1, 2012, 10 pages.

U.S. Appl. No. 14/203,991, Zhang, et al., "Generation of Custom Modular Objects", filed Mar. 11, 2014.

U.S. Appl. No. 14/204,239, Zhang, et al., "Gaming System for Modular Toys", filed Mar. 11, 2014.

U.S. Appl. No. 14/204,483, Saul, et al., "Interactive Smart Beads", filed Mar. 11, 2014.

U.S. Appl. No. 14/204,740, Saul, et al., "A Modular Construction for Interacting with Software", filed Mar. 11, 2014.

U.S. Appl. No. 14/204,929, Zhang, et al., "Storing State for Physical Modular Toys", filed Mar. 11, 2014.

U.S. Appl. No. 14/205,077, Zhang, et al., "Data Store for a Modular Assembly System", filed Mar. 11, 2014.

"Disney Infinity", Published on: Aug. 25, 2013, Available at: http://www.essentialkids.com.au/entertaining-kids/games-and-technology/disney-infinity-20130823-2sgg0.html.

Marshall, Rick, "Skylanders: Swap Force Review" Published on: Nov. 1, 2013, Available at: http://www.digitaltrends.com/game-reviews/skylanders-swap-force-review/.

Jennings, et al., "CONSTRUCT/VizM: A Framework for Rendering Tangible constructions", In Proceedings of the 14th Congress of the Iberoamerican Society of Digital Graphics, Nov. 17, 2010, 4 pages.

Kitamura, et al., "Real-time 3D Interaction with ActiveCube", In Proceedings of Extended Abstracts on Human Factors in Computing Systems, Mar. 31, 2001, 2 pages.

"Siftables are Changing the Shape of Computing", Published on: May 9, 2010, Available at: http://singularityhub.com/2010/05/05/siftables-are-changing-the-shape-of-computing/.

'Cuff—fashion wearable bracelets', 2014 Available at: http://www.elle.com/_mobile/news/fashion-accessories/cufflinc-wearable-techsrc=spr_TWITTER&spr_id=1448_51714286&linkId=7882609.

'Prodigy—Kickstarter', 2014 Available at: https://www.kickstarter.com/projects/121511007/prodigy-the-game.

CONSTRUKTS—Part time UI/UX and Engineer Positions, 2014 Available at: http://www.construkts.com.

"International Search Report and Written Opinion Issued in PCT Application No. PCT/US2015/038218", dated Sep. 17, 2015, 10 Pages.

"International Preliminary Report on Patentability Issued in PCT Application No. PCT/US2015/038218," dated Jun. 28, 2016, 7 Pages.

Final Office Action issued in U.S. Appl. No. 14/509,919, dated Jan. 2, 2019, 18 pages.

First Office Action and Search Report Issued in Chinese Patent Application No. 201580036018.X, dated Jan. 23, 2019, 28 pages.

Office Action issued in European Patent Application No. 15782188.5, dated Feb. 14, 2019, 4 pages.

"Proxi In-Device Charging Solution," retrieved from: http://powerbyproxi.com/consumer-electronics/industrial/proxi-in-device-charging-solution/, May 19, 2013, 8 pages.

"World of Warcraft 'Crafting Skills'," retrieved from: https://web.archive.org/web/20140527091410/http://us.battle.net/wow/en/, May 27, 2014, 3 pages.

Betters, Elyse, "LeapFrog LeapBand is an Activity Band for Kids with Virtual Pet Capabilities," retrieved from: https://uk.news.yahoo.com/leapfrog-leapband-activity-band-kids-virtual-pet-capabilities-231500937.html?guccounter=1, May 1, 2014, 1 page.

Final Office Action issued in U.S. Appl. No. 15/582,146, dated Jul. 9, 2018, 25 pages.

International Preliminary Report on Patentability issued in PCT Application No. PCT/US2015/054103, dated Jul. 21, 2016, 5 pages.

International Search Report and Written Opinion issued in PCT Application No. PCT/US2015/054103, dated Feb. 1, 2016, 12 pages.

Murphy, Samantha, "The Reinvented Tamagotchi: Bright, Flashy and Just as Needy," retrieved from: http://mashable.com/2014/02/20/tamagotchi-friends/, Feb. 20, 2014, 22 pages.

Non-Final Office Action issued in U.S. Appl. No. 14/509,862, dated Apr. 6, 2017, 15 pages.

(56) References Cited

OTHER PUBLICATIONS

Non-Final Office Action issued in U.S. Appl. No. 14/509,919, dated Jun. 13, 2018, 18 pages.
Non-Final Office Action issued in U.S. Appl. No. 14/509,940, dated Oct. 6, 2016, 26 pages.
Non-Final Office Action issued in U.S. Appl. No. 15/582,146, dated Oct. 5, 2017, 35 pages.
Non-Final Office Action issued in U.S. Appl. No. 15/582,146, dated Nov. 19, 2018, 22 pages.
Persson, Markus, "Minecraft," retrieved from: https://web.archive.org/web/20140531165512/https://minecraft.net/game, May 27, 2014, 3 pages.
Webster, Andrew, "Nex Band is a Smart, Modular Charm Bracelet for Gaming on Your Wrist," retrieved from: http://www.theverge.com/2014/2/13/5289404/nex-band-is-a-smart-modular-charm-bracelet, Feb. 13, 2014, 4 pages.
Wu, Yingying, "Customizable Wristband Sensor for Healthcare Monitoring 24/7," retrieved from: http://marblar.com/idea/493o7, Nov. 14, 2013, 4 pages.
"First office action and Search Report Issued in Chinese Patent Application No. 201580054924.2", dated May 24, 2019, 13 Pages.
"Final Office Action Issued in U.S. Appl. No. 15/582,146", dated Apr. 4, 2019, 25 Pages.
"Second Office Action and Search Report Issued in Chinese Patent Application No. 201580036018.X", dated Jul. 16, 2019, 69 Pages.
"Second Office Action Issued in Chinese Patent Application No. 201580054924.2", dated Aug. 9, 2019, 9 Pages.
"Third Office Action Issued in Chinese Patent Application No. 201580054924.2", dated Sep. 20, 2019, 7 Pages.
"Office Action Issued in Japanese Patent Application No. 2017-518972", dated Sep. 24, 2019, 9 Pages.

\* cited by examiner

CONTROLLING PHYSICAL TOYS USING A PHYSICS ENGINE

BACKGROUND

There are a number of different toys available that can move on their own. Some of these are controlled by the user (e.g. remote control toys) and others are not controlled except for by being started (e.g. switched on or wound up) and stopped (e.g. switched off) by the user. Examples of the latter type include motorized toy trains which run on a track when switched on until they are switched off or run out of power and toy vehicles which a user pulls back and then lets go and the vehicle moves forward until the spring mechanism (which was wound by the pulling back of the vehicle) has unwound.

The embodiments described below are not limited to implementations which solve any or all of the disadvantages of known toys.

SUMMARY

The following presents a simplified summary of the disclosure in order to provide a basic understanding to the reader. This summary is not an extensive overview of the disclosure and it does not identify key/critical elements or delineate the scope of the specification. Its sole purpose is to present a selection of concepts disclosed herein in a simplified form as a prelude to the more detailed description that is presented later.

Methods and systems for controlling physical toys using a physics engine are described. In an embodiment, a physics engine within an interactive software experience is used to model the motion of a virtual object in a virtual environment. The output of this modelling is then imposed on a physical toy which corresponds to the virtual object such that the motion of the physical toy in the real world more closely matches the motion of the virtual object in the virtual environment. In various examples, the modelling is imposed through control signals which are generated based on output of the physics engine and used to control actuators within the physical toy to change the motion of at least a part of the toy.

Many of the attendant features will be more readily appreciated as the same becomes better understood by reference to the following detailed description considered in connection with the accompanying drawings.

DESCRIPTION OF THE DRAWINGS

The present description will be better understood from the following detailed description read in light of the accompanying drawings, wherein.

Like reference numerals are used to designate like parts in the accompanying drawings.

DETAILED DESCRIPTION

Figure 1:
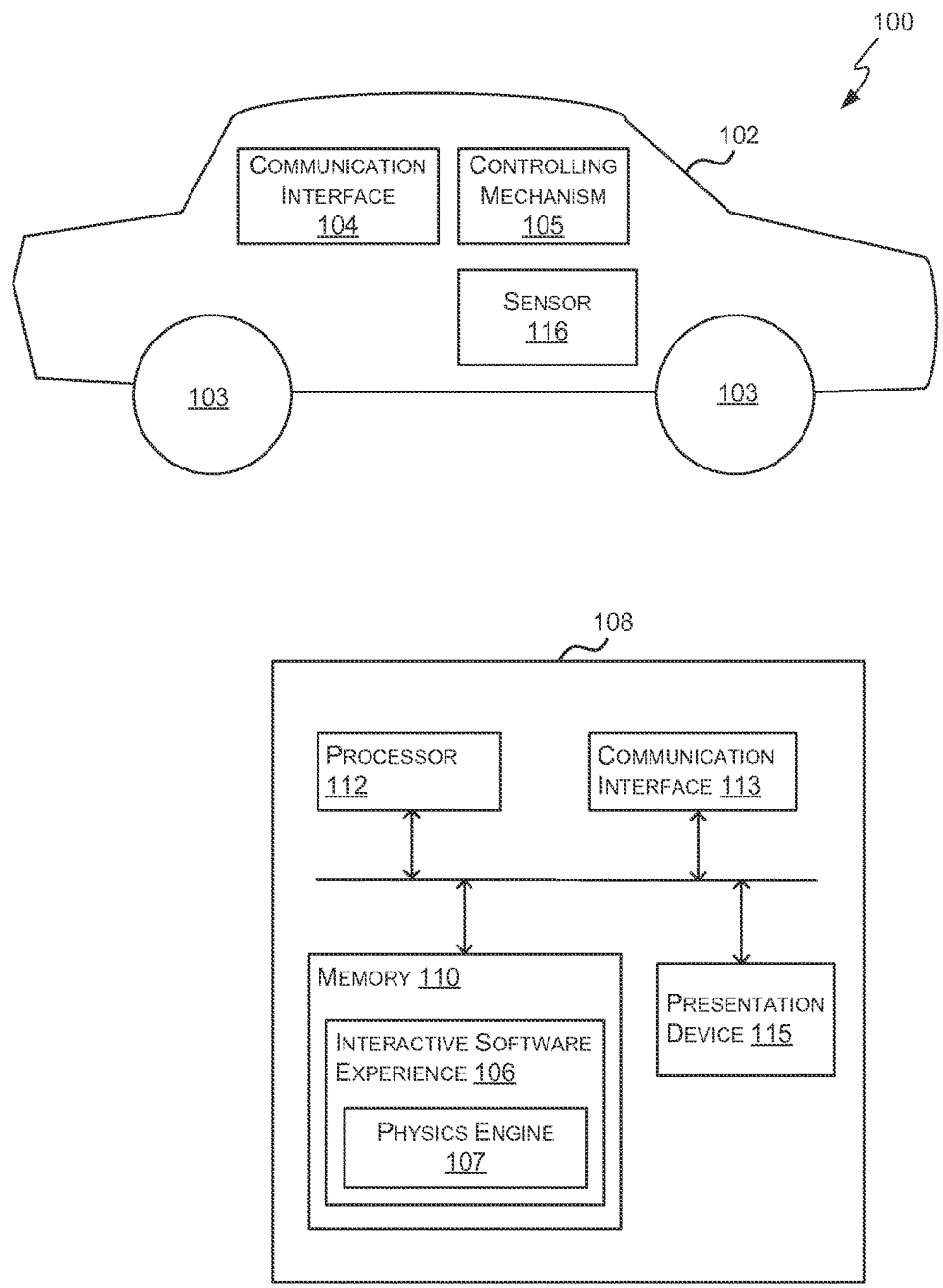
FIG. 1 is schematic diagram of an example play system.

The detailed description provided below in connection with the appended drawings is intended as a description of the present examples and is not intended to represent the only forms in which the present example may be constructed or utilized. The description sets forth the functions of the example and the sequence of steps for constructing and operating the example. However, the same or equivalent functions and sequences may be accomplished by different examples.

As described above, there are a number of different toys available that can move on their own. These toys are physical, real-world toys which a user can touch and pick-up. These are distinct from virtual objects which exist in a virtual world (e.g. in a computer game). A user can interact with a virtual object (e.g. using a keyboard, mouse, touch screen or games controller) but cannot touch or pick-up a virtual object. A virtual object has no mass, unlike a real-world object.

A number of computer games have been developed in which gameplay is enabled (or unlocked) through the use of physical character toys which are placed on a custom base connected via a USB lead to a games console. By placing different toys on the custom base, different gameplay is enabled. Such games, however, do not encourage user interaction with the toys (other than to place them on the custom base) and the toys are instead used as a physical replacement for configuring particular parameters of the computer game.

A play system is described below in which the motion of all or a part of a physical real-world toy is changed to reflect motion of a corresponding virtual toy (i.e. a virtual object in a virtual world). This system closely links play in the real world with play in the virtual world and encourages user interaction with the real-world toy as well as with the virtual world. A user may prefer to interact with the virtual toy through interaction with the real-world toy for various reasons including the more natural or playful interaction, the more realistic 3D and tactile nature of real world toys compared to virtual toys presented on a computing input/output device, the fidelity, accuracy and simplicity of control using real-world movements compared to learning and manipulating virtual controls, etc. On other occasions (or in other situations) the user may prefer to interact through the virtual controls, e.g. for access to menus, configuration or control mechanisms that are not present on the real-world toy. The virtual world enhances the physical play experienced by a user through its control of the motion of the real-world toy and also through presentation of the virtual world to the user which may provide images of an environment, sound effects, other objects with which the real-world toy (and its corresponding virtual object) can interact, etc.

In an example, the real-world toy is a toy car and the virtual object that corresponds to the toy car is a virtual car in a virtual world provided by an interactive software experience (which may be a computer game). The virtual world may provide one or more different environments in which the car (i.e. the virtual car and its real-world counterpart) can be driven, e.g. an arctic environment and a desert environment. The user selects an environment (e.g. the arctic environment in which the road surface is covered in snow and ice) and the virtual world shows the environment in its graphical user interface (GUI) and may show the virtual object (i.e. the virtual car) on the snowy road surface. When the user moves the real-world car, a physics engine within the interactive software experience provides control signals to the real-world car. These control signals change the motion of at least a part of the real-world car (e.g. one or more wheels) such that, to the user, the real-world car feels like it is driving on the snowy road surface depicted in the GUI and not the real-world surface on which the car is being moved (e.g. the carpet, a table top, etc.). This enhances the user experience through providing a realistic real-world motion which corresponds to the virtual world that is being displayed to the user.

As is known in the art, a physics engine simulates (or models) physical phenomena. In various examples a physics engine provides approximate simulation of one or more physical systems (e.g. gravity, collision detection, rigid body dynamics, soft body dynamics, rotation calculations, fluid dynamics, friction force modelling, etc.) in one or more dimensions (e.g. in 3D). The simulation may be intended to model real-world physics as closely as possible, or may deliberately differ from real-world physics in some ways, e.g. changing the gravitational constant, the speed of light, etc. or deliberately ignoring some physical constraints while following others, e.g. permitting the user to rotate at any desired speed without applying constraints related to the moment of inertia of rotation and the physical force required to achieve such rotation. The simulation may also deliberately depart from real-world physics in particular game situations, e.g. to assist players in certain situations by altering or violating physical models to make the game easier (e.g. permitting a virtual car to maintain traction and/or correct orientation around a corner despite the model determining that a skid and/or spin should happen). The simulation is performed in real-time and in many examples the physics engine is implemented in software. In various examples, a dedicated processor or dedicated subset of a multiprocessor (a physics processing unit, PPU) may be used to perform the calculations required by the physics engine.

FIG. 1 shows a schematic diagram of an example play system 100 which comprises a physical real-world toy 102 (which in this example is shaped like a vehicle) and an interactive software experience 106 which runs on a computing device 108. The toy 102 comprises a communication interface 104 (e.g. a receiver, which in many examples will be a wireless receiver) operative to receive control signals from the interactive software experience and a controlling mechanism 105 (which may comprise one or more actuators) which controls the motion (e.g. actual motion or range of possible motion) of at least a part of the toy (e.g. one or more of the wheels 103) based on control signals received via the receiver 104. The interactive software experience 106 comprises a physics engine 107 and is arranged to display a virtual object corresponding to the real-world toy 102 (e.g. on presentation device 115 which may be integral to or connected to the computing device 108) and outputs control signals to the real-world toy 102 via a communication interface 113 in the computing device 108. The physics engine 107 simulates the motion of the virtual object which corresponds to the real-world toy 102 in a virtual environment provided by the interactive software experience 106 and generates the control signals.

In various examples, the toy 102 may also comprise one or more sensors 116 which are arranged to detect motion of the toy (i.e. real-world motion) and communicate this to the interactive software experience 106 via the communication interface 104 (which may further comprise a transmitter, which in many examples will be a wireless receiver). In such examples, the interactive software experience 106 receives the sensor data (from sensor 116) via communication interface 113 and the sensor data received is used by the physics engine 107 when simulating the motion of the virtual object which corresponds to the real-world toy 102 in real-time. For example, the sensed motion of the real-world toy 102 may be applied to the virtual object which corresponds to the real-world toy 102 (e.g. such that if a user makes a real-world toy car turn right, the virtual world object mimics this motion and also turns right). It will be appreciated that compensating factors such as scaling factors may be used when applying the motion to the virtual object in the physics engine 107 (e.g. a virtual car may be modelled by the physics engine as if it was a similar mass to a real-world car and not the real-world toy car to which the virtual car corresponds). As described above, the simulation may be intended to model real-world physics as closely as possible, or may deliberately differ from real-world physics in some ways and/or in some game situations.

In various examples, one or more sensors 116 may in addition, or instead, be used to detect the real-world surroundings of the toy 102 and this information may be communicated to the interactive software experience (via communication interfaces 104, 113) and fed into the simulation performed by the physics engine 107. For example, a sensor 116 may detect obstacles in the real-world (e.g. walls, furniture, etc.) and data about these obstacles may be passed to the interactive software experience 106 and used in the modelling performed by the physics engine 107, e.g. such that the toy 102 reacts more realistically if it crashes into a piece of furniture or a wall. The detected surroundings (obstacles) may also be displayed visually to the user within the virtual world by the interactive software experience (e.g. obstacles may be represented as walls, rocks, etc.).

Figure 2:
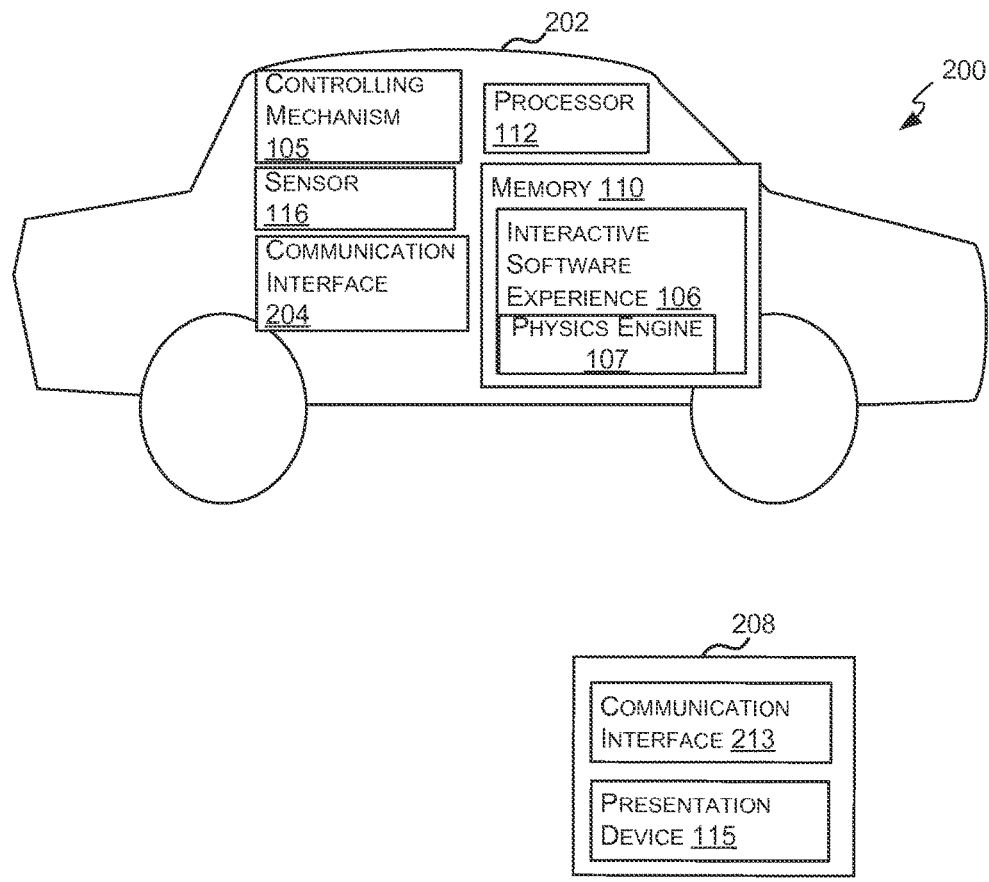
FIG. 2 is schematic diagram of a second example play system.

The computing device 108 which may be a desktop, laptop or tablet computer, a games console, a smart phone or any other computing device and in various examples computing device 108 may be a handheld computing device. In other examples, however, the computing device 108 may be integrated into the physical toy as shown in FIG. 2 and described below. In the example system 100 shown in FIG. 1, the interactive software experience 106 is stored in memory 110 in the computing device 108 and comprises device-executable instructions which are executed by one or more processors 112 (which may include a PPU). It will be appreciated that the computing device 108 may also comprise additional elements and the computing device 108 is described in more detail below with reference to FIG. 7. Furthermore, in various examples some or all of the computation associated with the interactive software experience 106 (and in particular the physics engine 107) may be performed on a remote computing device (e.g. a cloud-based computing device) which then provides inputs to software running on the computing device 108.

Although FIG. 1 shows the sensors 116 being located in the physical real-world toy 102, in various examples some or all of the sensors may instead be located within the computing device 108.

Although FIG. 1 shows the controlling mechanism 105 being located in the physical real-world toy 102, in various examples, some or all of the controlling mechanism 105 may be located within a proximate toy. For example, where the physical real-world toy 102 is a vehicle, it may drive along tracks formed from one or more other physical real-world toys and one or more of these other physical real-world toys may comprise the controlling mechanism 105 (and a communication interface) and control the motion of the vehicle toy based on control signals received from the computing device 108.

FIG. 2 shows a schematic diagram of a second example play system 200 which comprises a physical real-world toy 202 (which in this example is shaped like a vehicle) and an interactive software experience 106. In this example, some of the computing device (corresponding to computing device 108 in FIG. 1) is integrated within the toy 202, including the interactive software experience 106 and elements required to run the interactive software experience 106 (e.g. processor 112 and memory 110). As in the first example (shown in FIG. 1), the toy 202 comprises a communication interface 204; however in the second example, the communication interface 204 is not operative to receive control signals from the interactive software experience (as this is now run locally within the toy 202), but instead sends GUI data to a communication interface 213 in a device 208 which comprises the presentation device 115. This GUI data which is generated by the interactive software experience 106 comprises the virtual object corresponding to the real-world toy 202.

Like in the first example, the toy 202 in the second example 200 comprises a controlling mechanism 105 which controls the motion (e.g. actual motion or range of possible motion) of at least a part of the toy (e.g. one or more of the wheels 103) based on control signals generated by the physics engine 107 within the interactive software experience 106. As described above, the physics engine 107 simulates the motion of the virtual object which corresponds to the real-world toy 102 in a virtual environment provided by the interactive software experience 106 and generates the control signals based on the simulation. As described above, in various examples the toy 202 may comprise one or more sensors 116 which may be used to detect motion of the toy 202 and/or the surroundings of the toy 202.

In any of the examples described above, the translation between the simulation (performed by the physics engine 107) and the required change in the motion of at least a part of the real-world toy 102, 202 may be performed by the physics engine 107 (either in a separate stage or as an integrated part of the physics simulation that is optimized to compute both the virtual physics and real-world control in a single computational task), the interactive software experience 106 or by the controlling mechanism 105 or by a combination of two or more of these elements. As described above, some or all of the computation associated with the interactive software experience (and the physics engine) may be performed on a remote computing-device which provides input to the computing device 108.

Figure 3:
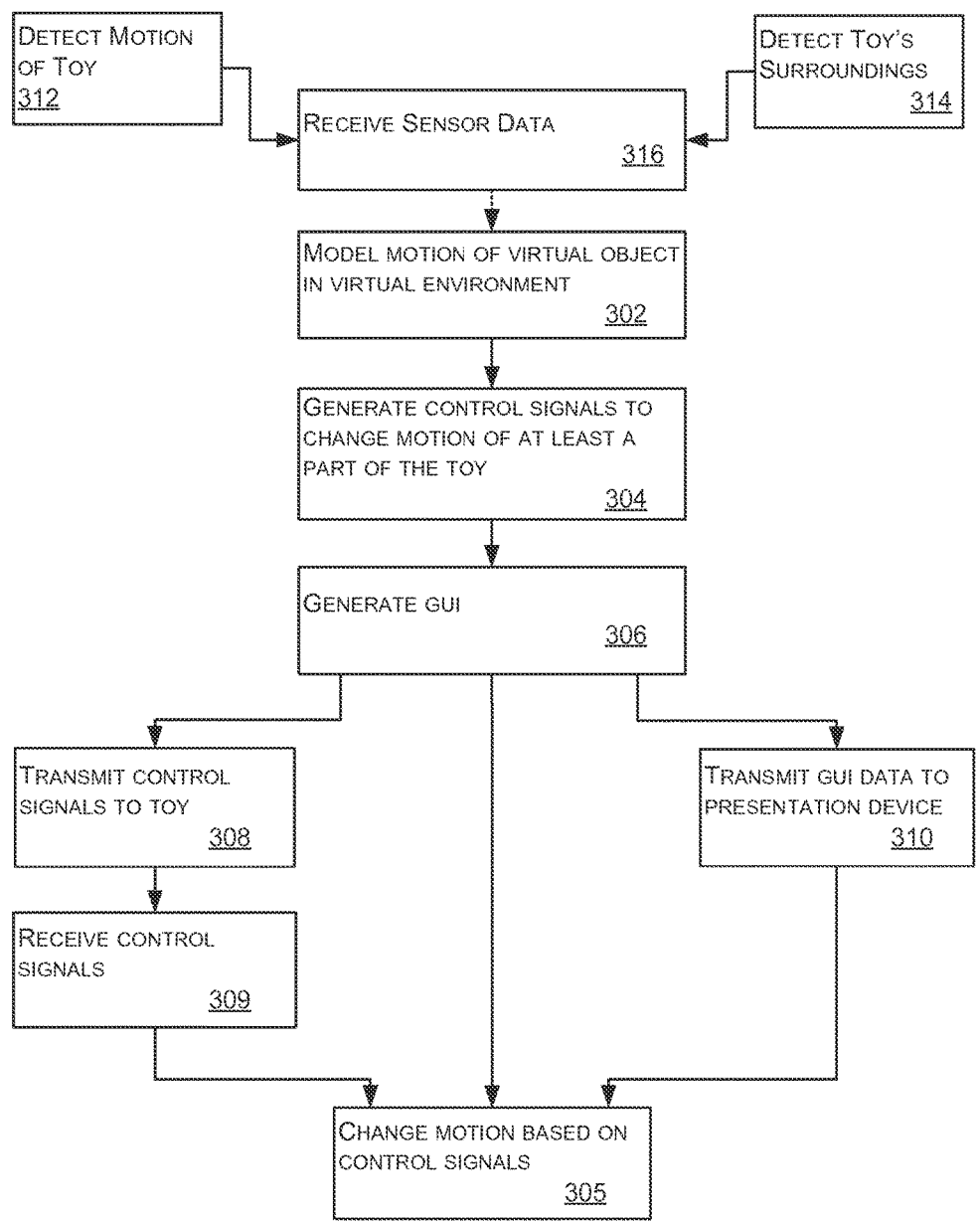
FIG. 3 is a flow diagram of an example method of operation of a play system such as those shown in FIGS. 1 and 2.

The operation of the play systems 100, 200 shown in FIGS. 1 and 2 can be described with reference to FIG. 3. As described above, the physics engine 107 in an interactive software experience 106 models the motion of a virtual object in a virtual environment (block 302) where the virtual object corresponds to a real-world object or toy 102, 202. The physics engine 107 or the interactive software experience 106 generates control signals (block 304) based on the modelling. These control signals are configured such that they change the motion of at least a part of the toy when they are implemented by the controlling mechanism 105 in the real-world toy 102, 202 (block 305). The interactive software experience 106 may also generate a GUI which shows the virtual object (block 306) and in various examples the virtual object is depicted in the GUI in the virtual environment which was used in the modelling (in block 302). In addition or instead, the GUI generated in block 306 may provide ambient effects (e.g. flashes or other visual effects and/or sound effects) and/or display status information relating to the interactive software experience (e.g. number of lives remaining).

It will be appreciated that the motion may be changed in many ways (in block 305) and in various examples it may be augmented (e.g. subsequent motion of the toy be a user may be enhanced by the controlling mechanism in some way), constrained (e.g. a range of possible motion may be limited) or otherwise affected. In various examples, the control signals (generated in block 304) may attempt to replicate virtual-world motion (of the virtual object) in the real world (with the real-world toy that corresponds to the virtual object). Exact replication may not be possible and so in various examples, the control signals (generated in block 304) may attempt to minimize any difference between real-world motion of the real-world toy and virtual-world motion of the virtual object which corresponds to the real-world toy. In other examples, however, the control signals (generated in block 304) may not result in replication of the virtual-world motion but may change the real-world motion in a similar, but not identical manner and this may be a consequence of a limitation in the operation of actuators or other elements within the controlling mechanism 105. For example, although in the virtual world the virtual object (e.g. a virtual car) may roll over, the control signals may cause the real-world toy (e.g. a toy car) to move sideways or stop but not to roll over.

In examples where the interactive software experience 106 is not run within the real-world toy (e.g. as shown in FIG. 1), the control signals (generated in block 304) are transmitted to the real-world toy (block 308) and received by the real-world toy (block 309). In examples where the interactive software experience 106 is not run within a computing device that has an integral presentation device 115 (e.g. a display), the GUI data is transmitted to the presentation device 115 for display to the user (block 310).

In various examples, a real-world toy 102, 202 comprises one or more sensors 116 which may detect the motion of the real-world toy (block 312) and/or the real-world toy's surroundings (block 314). In such examples, the sensor data is received by the interactive software experience 106 (block 316) and used in the modelling (in block 302) and/or in generating the GUI (in block 306).

Figure 4:
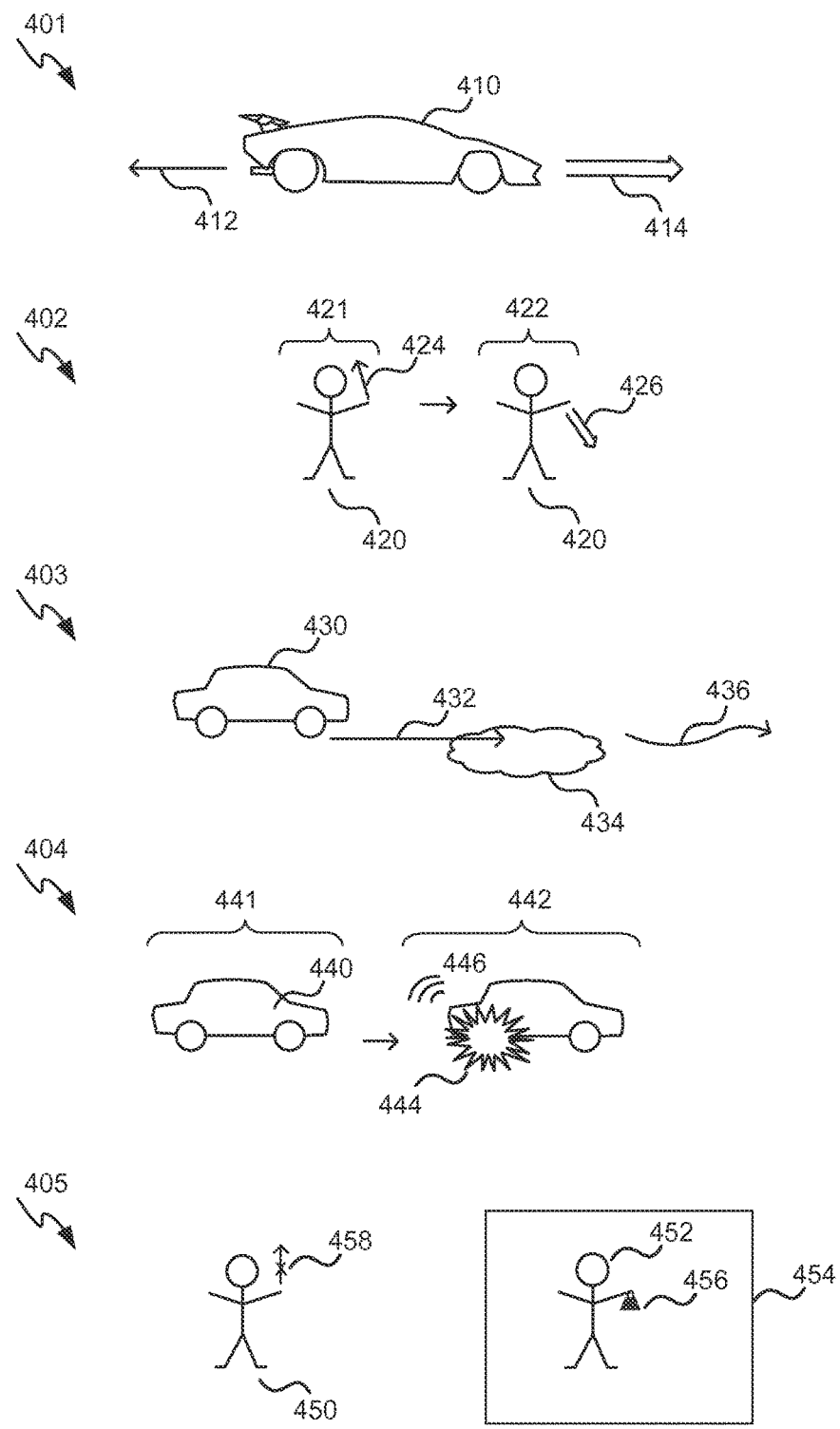
FIG. 4 shows various examples of real-world toys.
Figure 5:
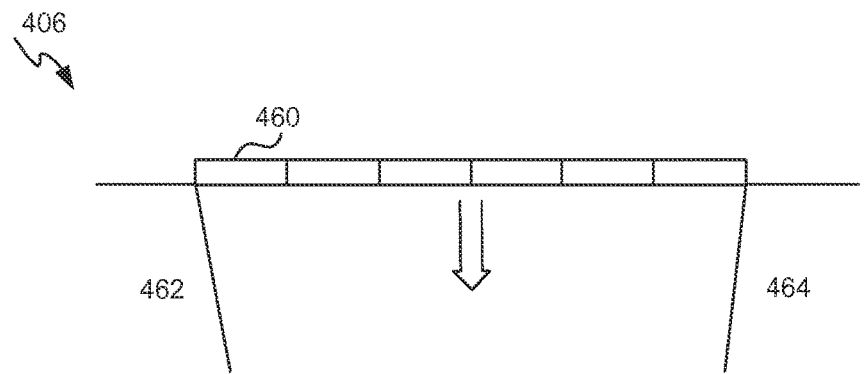
FIG. 5 shows further examples of real-world toys.
Figure 5:
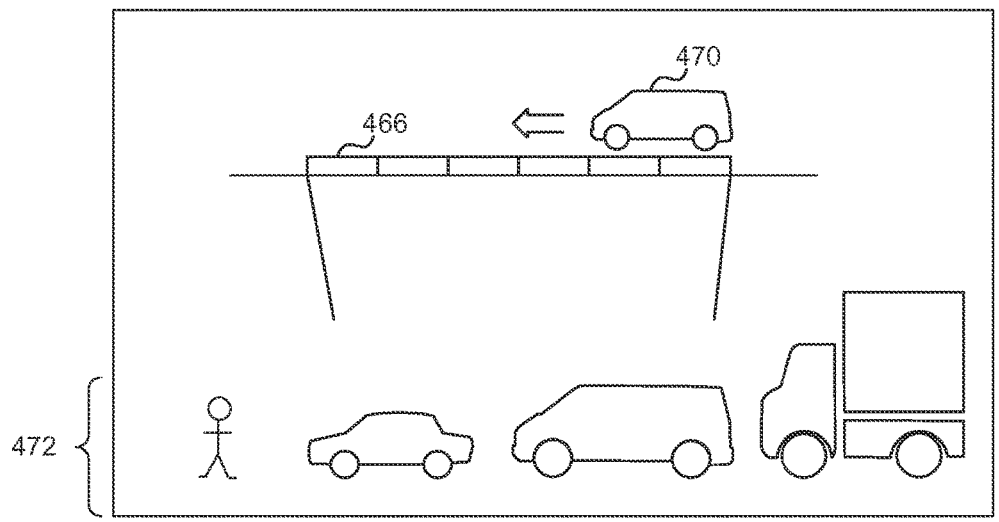

FIGS. 4 and 5 show a number of different examples of real-world toys and how the motion of the entire toy, or parts thereof, may be affected by control signals generated by an interactive software experience 106 based on modelling performed in a physics engine 107.

In the first example 401, the real-world toy 410 is a toy car. When a user moves the car backwards (as indicated by arrow 412), this motion is sensed by the car (and/or by sensors in the computing device) and input to the physics engine. The physics engine models the resultant motion of the corresponding virtual object and provides control signals to the toy car 410 which, when implemented by the controlling mechanism 105, cause the toy car 410 to move forwards (as indicated by arrow 414). In this way, the toy car 410 operates (as far as the user experience is concerned) as if it has a spring mechanism inside it; however it does not and the effect is generated by the physics engine. By generating the car's response in this way, rather than having a mechanical mechanism that reacts to the user pulling the car back, the resultant motion of the car can be modified in many different ways based on characteristics in the virtual world (e.g. to reflect whether the car is being driven on a road/field/beach, to reflect different engine sizes, etc.).

In the second example 402, the real-world toy 420 is a figurine and is shown at two different points in time 421-422. This toy 420 may, for example, be a knight engaged in a battle or a worker who is chopping wood. When a user lifts the arm of the figuring 420 (as indicated by arrow 424 in the first scene 421), this motion is sensed by the figurine (and/or by sensors in the computing device) and input to the physics engine. The physics engine models the resultant motion of the arm of the corresponding virtual object (e.g. the virtual knight or worker) and provides control signals to the figurine 420 which, when implemented by the controlling mechanism 105, cause the arm to move forwards and down (as indicated by arrow 426 in the second scene 422), e.g. as if the figurine is throwing a punch or chopping a log. As with the first example, by generating the motion of the arm in this way, rather than having a mechanical mechanism that reacts to the user lifting up the figurine's arm, the resultant motion of the arm can be modified in many different ways based on characteristics in the virtual world (e.g. based on what the figurine is doing in the virtual world).

In the third example 403, the real-world toy 430 is again a toy car. When a user moves the car forwards (as indicated by arrow 432), this motion may be sensed by the car (and/or by sensors in the computing device) and input to the physics engine, although in other examples sensing is not required and the motion of the car forwards in the virtual world may not rely on sensing motion of the real-world toy 430. In the virtual world there is an oil slick 434 and the physics engine models the resultant motion of the corresponding virtual object when it drives into the oil slick 434. The interactive software experience then provides control signals to the toy car 430 which, when implemented by the controlling mechanism 105, cause the toy car 430 to swerve or otherwise be difficult to drive in straight line in the real-world (as indicated by arrow 436). In this way, the real-world toy car 430 operates (as far as the user experience is concerned) as if it has driven into an oil slick which only exists in the virtual world (depicted by the interactive software experience). By using the physics engine in this way, the motion of the real-world car can be modified dynamically to correspond to changes in the virtual environment (e.g. driving onto ice, into water, onto sand, etc.) and provide an enhanced user experience (e.g. a more immersive experience) with the physical toy.

In the fourth example 404, the real-world toy 440 is also a toy car and the car 440 is shown at two different points in time 441-442. In this example, a user may move the car and this may be sensed by the car (and/or by sensors in the computing device) and communicated to the physics engine, sensing alternatively may be omitted. In the first scene 441 all the tires are intact; however, in the second scene 442 the motion of the car 440 is modified (as indicated by lines 446 representing vibrations/juddering of the car) as if one of the tires has burst 444. The motion which results from the burst tire is modelled by the physics engine and the interactive software experience then provides control signals to the toy car 440 which, when implemented by the controlling mechanism 105, causes the juddering/vibrations 446. This is another example of how, by using the physics engine in this way, the motion of the real-world car can be modified dynamically to correspond to changes in the virtual environment (e.g. changes in the state of the virtual object) and provide an enhanced user experience (e.g. a more immersive experience) with the physical toy.

In the fifth example 405, the real-world toy 450 is a figurine and the corresponding virtual object 452 (e.g. a virtual person) is shown in the GUI 454 of the interactive software experience. In the example shown, the virtual person 452 is carrying a heavy weight 456. The physics engine models the effect on the arm of the virtual person of carrying this weight 456 and provides control signals to the figurine 450 which, when implemented by the controlling mechanism 105, prevent the user from lifting up the corresponding arm on the real-world figurine 450 (as indicated by the arrow 458 with a cross through it). This is further example of how, by using the physics engine in this way, the motion of a real-world toy can be modified dynamically to correspond to changes in the virtual environment (e.g. changes in the state of the virtual object) and provide an enhanced user experience (e.g. a more immersive experience) with the physical toy.

In the sixth example 406, the real-world toy 460 is a set of blocks which are used to create a bridge across a gap between two objects 462, 464 which may be other blocks (i.e. other real-world toys) or parts of the surroundings (e.g. furniture which is sensed by the bricks (and/or by sensors in the computing device) and communicated to the interactive software experience). The corresponding virtual object 466 (e.g. a virtual bridge formed from virtual blocks) is shown in the GUI 468 of the interactive software experience. In the example shown, a user can select a vehicle (from vehicles 472) to drive (in the virtual world) across the virtual bridge 466 and in the example shown, the user has selected a small truck 470. The physics engine models the effect on the virtual bridge 466 of the small truck 470 being driven across it and if it determines that the bridge will buckle or collapse, the interactive software experience provides control signals to the real-world blocks 466 which, when implemented by the controlling mechanism 105, cause the real-world bridge to collapse (as indicated by the double arrow). This is yet further example of how, by using the physics engine in this way, the motion of a real-world toy can be modified dynamically to correspond to changes in the virtual object and provide an enhanced user experience (e.g. a more immersive experience) with the physical toy.

Figure 6:
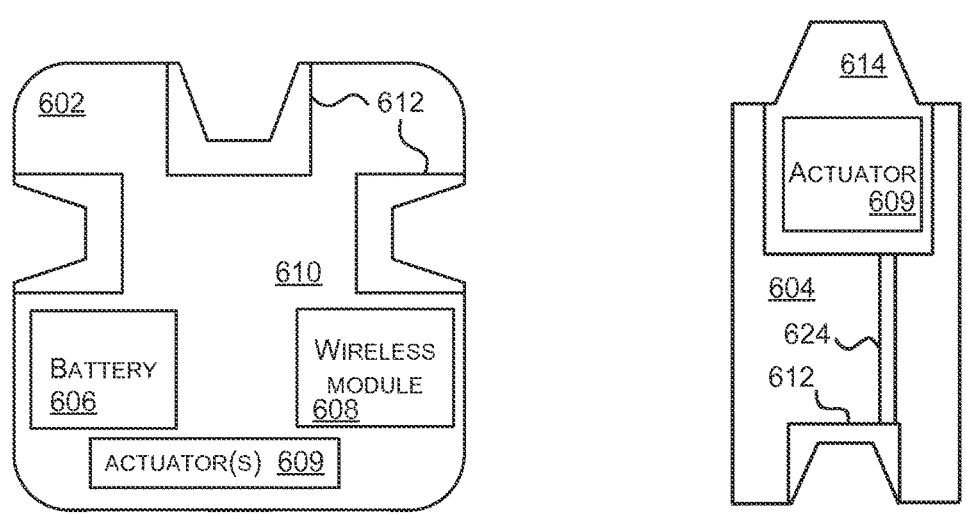
FIG. 6 is a schematic diagram of two example modules which may be connected together to form a toy.

In various examples, a real-world toy in the examples described above may themselves be modular and be formed from two or more modules. FIG. 6 is a schematic diagram of two example modules which may be connected together to form a real-world toy. FIG. 6 shows a core module 602 and a peripheral module 604. The core module 602 comprises a battery 606, a wireless communications module 608, a processor 610, one or more actuators 609 and one or more connectors 612. The battery 606 provides power to components within the core (such as processor 610, wireless communications module 608 and actuator(s) 609) and also to some/all of the peripheral modules 604 via the connectors 612. The wireless communications module 608 enables the core module 602 to communicate with a computing device running the interactive software experience 106. Any suitable wireless technology may be used (e.g. Bluetooth®, BLE, WiFi™ or WiFi™ Direct, Near Field Communication (NFC), 802.15.4, etc.). The wireless communications module 608 may communicate directly with the computing device 108 (as shown in FIG. 1) running the interactive software experience 106 or may communicate via a network (e.g. a home network or the internet) or intermediary device (e.g. a wireless access point). The connectors 612 physically attach the peripheral modules 604 to the core module 602 and may also pass data and power between modules.

The processor 610 and actuator(s) 609 within the core module 602 act as the controlling mechanism 105 described above and change the motion of the real-world toy based on control signals generated by the interactive software experience 106. Examples of suitable actuators include motors, vibration units, servos, muscle wire, solenoids, electromagnetic actuators (e.g. if the environment is metallic), pneumatic or hydraulic actuators, etc. The processor 610 may be a microprocessor, controller or any other suitable type of processor for processing computer executable instructions to control the operation of the core module in order to change the motion of at least a part of the real-world toy and this may involve changing the motion of the core module relative to a connected peripheral module.

In various examples, the processor may also collect the IDs (which may be a unique ID or an ID shared with other identical-looking modules, e.g. an ID for a particular shape or type of module) of each of the modules connected together to form a coherent physical whole object which forms the real-world toy. The module IDs may be collected from each of the connected modules directly (e.g. via a bus) or each module may collect information on its neighbors with the core module aggregating the data provided by its direct neighbor play pieces. In various examples, these module IDs may be collected via the data connection provided by the connectors 612 and in other examples, another means may be used (e.g. NFC, QR codes or computer vision). Where other means are used, the core module 602 may comprise additional hardware/software such as an NFC reader module or a camera or other image sensor to collect the module IDs of all the connected play pieces. In addition to collecting the module IDs of the connected module (e.g. to generate a set or list of connected modules), the core module may detect the topology of the arrangement of play pieces.

Each peripheral module 604 comprises one or more connectors 612, 614 to physically attach the module to another module to form a coherent physical whole object which forms the real-world toy. The peripheral module 604 may also comprise one or more actuators 609 for moving the peripheral module. The peripheral module 604 may further comprises electrical connections 624 (e.g. in the form of a bus comprising 2 wires, data and ground) between the two connectors 612, 614. In the example shown in FIG. 6, the actuator 609 is shown within the housing of the connector 614; however, in other examples it may be separate from the connector.

Although not shown in FIG. 6, a core module and/or a peripheral module 604 may also comprise a storage element which stores an identifier (ID) for the module (which may be referred to as the module ID) and may comprise additional data, such as the shape and/or appearance of the module, locations of any connection points, etc. The storage element may comprise memory or any other form of storage device. The storage element which stores the module ID may be within a connector 612, the wireless module 608 or may be a separate entity within the module 602, 604.

In various examples, a peripheral module 604 may also comprise a processor (not shown in FIG. 6) and this may be within the housing of the connector 614 or separate from the connector. In various examples, a peripheral module 604 may also comprise a battery (not shown in FIG. 6) and this may provide power to electronics within the peripheral module 604 and/or to neighboring modules (which may be peripheral or core modules). In this way, if an arrangement of modules requires more power than can be provided by the battery 606 in the core module 602, additional power can be provided by a battery in a peripheral module 604.

Although not shown in FIG. 6, a module 602, 604 may also comprise one or more sensors for detecting motion of the module or of the real-world toy as a whole. Examples of sensors that may be used in modules include: temperature sensors, vibration sensors, accelerometers, tilt sensors, gyroscopic sensors, rotation sensors, magnetometers, proximity sensors (active/passive infrared or ultrasonic), sound sensors, light sensors, etc.

It will be appreciated that the modules 602, 604 shown in FIG. 6 may comprise additional elements not shown in FIG. 6. It will further be appreciated that although FIG. 6 shows the modules as being square or rectangular, each of the modules can have any physical form factor (e.g. any shape of external housing) which is compatible with the other modules (i.e. each module is shaped such that it can connect to at least one other module, without the outer housing clashing).

Figure 7:
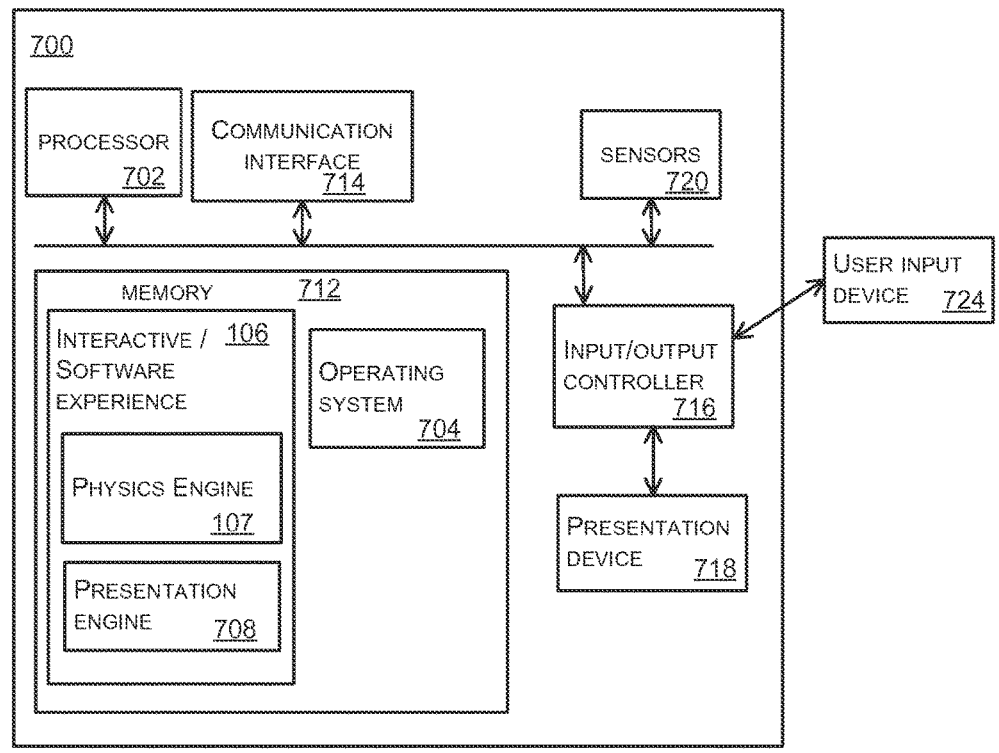
FIG. 7 illustrates an exemplary computing-based device in which embodiments of the methods described herein may be implemented.

FIG. 7 illustrates various components of an exemplary computing-based device 700 which may be implemented as any form of a computing and/or electronic device, and in which embodiments of the methods described herein may be implemented. This computing based device 700 may, for example, be the computing device 108 shown in FIG. 1 or the real-world toy 202 shown in FIG. 2.

Computing-based device 700 comprises one or more processors 702 which may be microprocessors, controllers or any other suitable type of processors for processing computer executable instructions to control the operation of the device in order to perform the methods described herein (e.g. to model the virtual object in the virtual environment and generate control signals to change the motion of a real-world toy corresponding to the virtual object). In various examples, one of the processors 702 may be a PPU and may be used by the physics engine. In some examples, for example where a system on a chip architecture is used, the processors 700 may include one or more fixed function blocks (also referred to as accelerators) which implement a part of the method of generating and presenting an interactive story in hardware (rather than software or firmware). Alternatively, or in addition, the functionality described herein can be performed, at least in part, by one or more hardware logic components. For example, and without limitation, illustrative types of hardware logic components that can be used include Field-programmable Gate Arrays (FPGAs), Program-specific Integrated Circuits (ASICs), Program-specific Standard Products (ASSPs), System-on-a-chip systems (SOCs), Complex Programmable Logic Devices (CPLDs).

Platform software comprising an operating system 704 or any other suitable platform software may be provided at the computing-based device to enable application software, such as an interactive software experience 106 to be executed on the device. As shown in FIG. 7, the interactive software experience 106 may comprise one or more modules, such as a physics engine 107 and a presentation engine 708 arranged to generate the GUI depicting the virtual world and the virtual object which corresponds to the real-world toy.

The computer executable instructions may be provided using any computer-readable media that is accessible by computing based device 700. Computer-readable media may include, for example, computer storage media such as memory 712 and communications media. Computer storage media, such as memory 712, includes volatile and non-volatile, removable and non-removable media implemented in any method or technology for storage of information such as computer readable instructions, data structures, program modules or other data. Computer storage media includes, but is not limited to, RAM, ROM, EPROM, EEPROM, flash memory or other memory technology, CD-ROM, digital versatile disks (DVD) or other optical storage, magnetic cassettes, magnetic tape, magnetic disk storage or other magnetic storage devices, or any other non-transmission medium that can be used to store information for access by a computing device. In contrast, communication media may embody computer readable instructions, data structures, program modules, or other data in a modulated data signal, such as a carrier wave, or other transport mechanism. As defined herein, computer storage media does not include communication media. Therefore, a computer storage medium should not be interpreted to be a propagating signal per se. Propagated signals may be present in a computer storage media, but propagated signals per se are not examples of computer storage media. Although the computer storage media (memory 712) is shown within the computing-based device 700 it will be appreciated that the storage may be distributed or located remotely and accessed via a network or other communication link (e.g. using communication interface 714).

The communication interface 714 may be arranged to transmit control signals to the real-world toy and may comprise a wireless transmitter. In various examples, the communication interface 714 may also be arranged to receive sensor data from the real-world toy and may comprise a wireless receiver. In such examples the communication interface 714 may receive data from the real-world toy directly or via an intermediary device.

In examples where the computing-based device 700 is integrated within a real-world toy (e.g. as shown in FIG. 2), the communication interface 714 may not be arranged to transmit control signals to the real-world toy but instead may be arranged to transmit display data to a computing device comprising a presentation device 115.

The computing-based device 700 may also comprise an input/output controller 716. The input/output controller may be arranged to output presentation information (or display data) for use in presenting the virtual world to the user to a presentation device 718 (e.g. a display device) which may be separate from or integral to the computing-based device 700. The input/output controller 716 may also be arranged to receive and process input from one or more devices, such as a user input device 724 (e.g. a mouse, keyboard, camera, microphone or other sensor). In some examples the user input device 724 may detect voice input, user gestures or other user actions and may provide a natural user interface (NUI). This user input may be used to further control the interactive story. In an embodiment the presentation device 718 may also act as the user input device 724 if it is a touch sensitive display device. The input/output controller 716 may also output data to devices other than the display device, e.g. a locally connected printing device (not shown in FIG. 7).

Any of the input/output controller 716, presentation device 718 and the user input device 724 may comprise NUI technology which enables a user to interact with the computing-based device in a natural manner, free from artificial constraints imposed by input devices such as mice, keyboards, remote controls and the like. Examples of NUI technology that may be provided include but are not limited to those relying on voice and/or speech recognition, touch and/or stylus recognition (touch sensitive displays), gesture recognition both on screen and adjacent to the screen, air gestures, head and eye tracking, voice and speech, vision, touch, gestures, and machine intelligence. Other examples of NUI technology that may be used include intention and goal understanding systems, motion gesture detection systems using depth cameras (such as stereoscopic camera systems, infrared camera systems, RGB camera systems and combinations of these), motion gesture detection using accelerometers/gyroscopes, facial recognition, 3D displays, head, eye and gaze tracking, immersive augmented reality and virtual reality systems and technologies for sensing brain activity using electric field sensing electrodes (EEG and related methods).

Although the present examples are described and illustrated herein as being implemented in a play system (comprising a real-world toy and an associated interactive software experience) as shown in FIGS. 1 and 2, the systems described are provided as examples and not limitations. As those skilled in the art will appreciate, the present examples are suitable for application in a variety of different types of play systems.

An aspect provides a toy comprising an input for receiving control signals generated by an interactive software experience. The control signals are generated based on modelling performed by a physics engine of a virtual object in a virtual environment and the virtual object corresponds to the toy or a proximate toy. The toy also comprises a controlling mechanism operative to change a motion of at least a part of the toy (e.g. a wheel, a limb, etc.) corresponding to the virtual object in response to receiving a control signal. In an example, the virtual object corresponds to the toy itself and the controlling mechanism changes the motion of at least a part of the toy itself. In another example, the virtual object corresponds to a proximate toy (i.e. a second toy which is close to the toy itself) and the controlling mechanism changes the motion of at least a part of that proximate toy.

This makes the real-world motion of the real-world toy more closely match (e.g. in terms of look and/or feel to a user) the virtual world motion within the interactive software experience. This enhances the user experience and provides a more immersive experience (i.e. the user feels more like the physical toy is part of the virtual world).

In various examples, the controlling mechanism is operative to change the motion of at least a part of the toy corresponding to the virtual object to reduce a difference between modelled motion of the virtual object in the virtual environment and real-world motion of the toy corresponding to the virtual object. For example, the controlling mechanism may be operative to change the motion of at least a part of the toy to mimic (in the real world) the modelled motion of the virtual object in the virtual environment.

In various examples, the controlling mechanism comprises one or more actuators, wherein the actuators are controllable by the control signals. These actuators change the motion of the real-world toy.

In various examples, the input comprises a communication interface arranged to receive signals from a computing device running (or capable of running) the interactive software experience.

In various examples, the toy further comprises one or more sensors arranged to detect an aspect of the surroundings of the toy corresponding to the virtual object and/or to detect motion of the toy corresponding to the virtual object. This further enhances the user experience and provides a more immersive experience (i.e. the user feels more like the physical toy is part of the virtual world). By sensing the motion, the physics engine can generate complementary or reactive motion within the real-world toy (e.g. it can generate a reaction within the toy to an initial action by a user, as described above with reference to examples 401, 402, 405).

In various examples, where the toy corresponds to the virtual object, the toy further comprises the physics engine.

In various examples, where the toy corresponds to the virtual object, the toy further comprises a processor and a memory. The memory comprises the physics engine (which comprises device-executable instructions which when executed cause the processor to model motion of the virtual object in the virtual environment) and device-executable instructions which when executed cause the processor to: generate the control signals based on the modelling; and generate graphical user interface data, the graphical user interface showing the virtual object in the virtual environment.

In various examples, the toy further comprises a communication interface arranged to transmit the graphical user interface data to a computing device comprising a presentation device for displaying the graphical user interface.

Another aspect provides a method comprising: modelling, in a physics engine, motion of a virtual object in a virtual environment; and generating control signals to impose output from the physics engine on a physical toy by changing a motion of at least a part of a physical toy, wherein the virtual object corresponds to the physical toy. The method may further comprise generating graphical user interface data, the graphical user interface showing the virtual object in the virtual environment.

In various examples, the control signals are generated to change the motion of at least a part of the toy to reduce a difference between modelled motion of the virtual object in the virtual environment and real-world motion of the toy.

In various examples the method further comprises: transmitting, via a communication interface, the control signals to the physical toy.

In various examples the method further comprises: displaying the graphical user interface on a presentation device.

In various examples the method further comprises: transmitting, via a communication interface, the graphical user interface data to a presentation device.

In various examples the method further comprises: receiving sensor data, the sensor data identifying motion of the toy and/or an aspect of the toy's surroundings; and using the sensor data when modelling, in a physics engine, motion of the virtual object in the virtual environment.

In various examples, the sensor data is received from the toy via a communication interface.

Another aspect provides a computing-based device comprising: a processor and a memory. The memory comprises device-executable instructions which when executed cause the processor to: model motion of a virtual object in a virtual environment; and generate the control signals based on the modelling, the control signals being operative to change a motion of at least a part of a physical toy which corresponds to the virtual toy. The device-executable instructions may, when executed, further cause the processor to generate graphical user interface data, the graphical user interface showing the virtual object in the virtual environment.

In various examples, the control signals are operative to reduce a difference between modelled motion of the virtual object in the virtual environment and real-world motion of the toy.

In various examples, the computing-based device further comprises a communication interface arranged to transmit the control signals to the physical toy or to a proximate toy. In this way, the control of the motion may be implemented within the toy that is being modelled or a toy which is close to the one that is being modelled by the physics engine (e.g. where the control is performed by tracks, a baseboard, etc.).

In various examples, the communication interface is further arranged to receive sensor data from the physical toy, the sensor data providing information on motion of the physical toy and/or surroundings of the physical toy and wherein the sensor data is used to model the motion of the virtual object in the virtual environment.

Another aspect provides a toy comprising a means for receiving control signals generated by an interactive software experience. The control signals are generated based on modelling performed by a physics engine of a virtual object in a virtual environment and the virtual object corresponds to the toy. The toy also comprises means for changing a motion of at least a part of the toy (e.g. a wheel, a limb, etc.) in response to receiving a control signal.

A yet further aspect provides a computing-based device comprising means for modelling motion of a virtual object in a virtual environment and means for generating the control signals based on the modelling, the control signals being operative to change a motion of at least a part of a physical toy which corresponds to the virtual toy. The computing-based device may further comprise means for generating graphical user interface data, the graphical user interface showing the virtual object in the virtual environment.

The term 'computer' or 'computing-based device' is used herein to refer to any device with processing capability such that it can execute instructions. Those skilled in the art will realize that such processing capabilities are incorporated into many different devices and therefore the terms 'computer' and 'computing-based device' each include PCs, servers, mobile telephones (including smart phones), tablet computers, set-top boxes, media players, games consoles, personal digital assistants and many other devices.

The methods described herein may be performed by software in machine readable form on a tangible storage medium e.g. in the form of a computer program comprising computer program code means adapted to perform all the steps of any of the methods described herein when the program is run on a computer and where the computer program may be embodied on a computer readable medium. Examples of tangible storage media include computer storage devices comprising computer-readable media such as disks, thumb drives, memory etc. and do not include propagated signals. Propagated signals may be present in a tangible storage media, but propagated signals per se are not examples of tangible storage media. The software can be suitable for execution on a parallel processor or a serial processor such that the method steps may be carried out in any suitable order, or simultaneously.

This acknowledges that software can be a valuable, separately tradable commodity. It is intended to encompass software, which runs on or controls "dumb" or standard hardware, to carry out the desired functions. It is also intended to encompass software which "describes" or defines the configuration of hardware, such as HDL (hardware description language) software, as is used for designing silicon chips, or for configuring universal programmable chips, to carry out desired functions.

Those skilled in the art will realize that storage devices utilized to store program instructions can be distributed across a network. For example, a remote computer may store an example of the process described as software. A local or terminal computer may access the remote computer and download a part or all of the software to run the program. Alternatively, the local computer may download pieces of the software as needed, or execute some software instructions at the local terminal and some at the remote computer (or computer network). Those skilled in the art will also realize that by utilizing conventional techniques known to those skilled in the art that all, or a portion of the software instructions may be carried out by a dedicated circuit, such as a DSP, programmable logic array, or the like.

Any range or device value given herein may be extended or altered without losing the effect sought, as will be apparent to the skilled person.

Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims.

It will be understood that the benefits and advantages described above may relate to one embodiment or may relate to several embodiments. The embodiments are not limited to those that solve any or all of the stated problems or those that have any or all of the stated benefits and advantages. It will further be understood that reference to 'an' item refers to one or more of those items.

The steps of the methods described herein may be carried out in any suitable order, or simultaneously where appropriate. Additionally, individual blocks may be deleted from any of the methods without departing from the spirit and scope of the subject matter described herein. Aspects of any of the examples described above may be combined with aspects of any of the other examples described to form further examples without losing the effect sought.

The term 'comprising' is used herein to mean including the method blocks or elements identified, but that such blocks or elements do not comprise an exclusive list and a method or apparatus may contain additional blocks or elements.

The term 'subset' is used herein to refer to a proper subset such that a subset of a set does not comprise all the elements of the set (i.e. at least one of the elements of the set is missing from the subset).

It will be understood that the above description is given by way of example only and that various modifications may be made by those skilled in the art. The above specification, examples and data provide a complete description of the structure and use of exemplary embodiments. Although various embodiments have been described above with a certain degree of particularity, or with reference to one or more individual embodiments, those skilled in the art could make numerous alterations to the disclosed embodiments without departing from the spirit or scope of this specification.

The invention claimed is:

1. A physical real-world toy comprising:
an input for receiving control signals generated by an interactive software experience, the control signals being generated based on modelling of interactions of a virtual object in a virtual environment performed by a physics engine to simulate corresponding interactions of the physical real-world toy in a real physical system in at least one dimension, the virtual object corresponding to the physical real-world toy;
one or more sensors arranged to detect an aspect of surroundings of the physical real-world toy corresponding to the virtual object;
one or more sensors configured to detect motion of the physical real-world toy without reference to the surroundings of the physical real-world toy; and
a controlling mechanism operative to change a motion of at least a part of the physical real-world toy in response to receiving a control signal, the motion corresponding to at least one of the interactions of the virtual object in the virtual environment,
wherein the controlling mechanism is operative to provide a difference between modelled motion of the virtual object in the virtual environment and real-world motion of the physical real-world toy;
wherein the virtual environment is entirely software generated, and
wherein the interactive software experience is arranged to:
receive data associated with the detected aspect of the surroundings,
display corresponding virtual surroundings based on the data, the displayed corresponding virtual surrounding incorporated into the virtual environment, and model the interactions of the virtual object in the virtual environment.

2. The physical real-world toy according to claim 1, wherein the controlling mechanism is operative to reduce a difference between modelled motion of the virtual object in the virtual environment and real-world motion of the physical real-world toy corresponding to the virtual object.

3. The physical real-world toy according to claim 1, wherein the controlling mechanism comprises one or more actuators, wherein the actuators are controllable by the control signals.

4. The physical real-world toy according to claim 1, wherein the input comprises a communication interface arranged to receive signals from a computing device running the interactive software experience.

5. The physical real-world toy according to claim 1, wherein the controlling mechanism is operative to provide a difference between modelled motion of the virtual object in the virtual environment and real-world motion of the physical real-world toy corresponding to the virtual object.

6. The physical real-world toy according to claim 1, wherein the physical real-world toy corresponds to the virtual object and the physical real-world toy further comprises the physics engine.

7. The physical real-world toy according to claim 6, further comprising:
a processor; and
a memory,
wherein the physics engine comprises device-executable instructions stored in the memory which when executed cause the processor to model motion of the virtual object in the virtual environment,
and wherein the memory further comprises device-executable instructions which when executed cause the processor to:
generate the control signals based on the modelling; and
generate graphical user interface data, for a graphical user interface showing the virtual object in the virtual environment.

8. The physical real-world toy according to claim 7, further comprising a communication interface arranged to transmit the graphical user interface data to a computing device comprising a presentation device for displaying the graphical user interface.

9. A method comprising:
receiving sensor data, the sensor data identifying an aspect of surroundings of a physical toy in a real physical system without reference to the surroundings of the physical real-world toy;

modelling, in a physics engine, motion of a virtual object in a virtual environment to simulate a corresponding motion of the physical toy in the real physical system in at least one dimension, the virtual environment displaying, and incorporating, virtual surroundings based on the sensor data, wherein the virtual environment is absent real-world video imagery; and generating control signals to impose output from the physics engine on the physical toy by changing at least a part of the corresponding motion of the physical toy, wherein the virtual object corresponds to the physical toy and the control signals are operative to provide differences between the modelled motion of the virtual object in the virtual environment and the corresponding motion of the physical toy.

10. The method according to claim 9, wherein the control signals are generated to change at least a part of the corresponding motion of the physical toy to reduce a difference between modelled motion of the virtual object in the virtual environment and real-world motion of the physical toy.

11. The method according to claim 9, further comprising:
transmitting, via a communication interface, the control signals to the physical toy.

12. The method according to claim 9, further comprising:
generating graphical user interface data, for a graphical user interface showing the virtual object in the virtual environment.

13. The method according to claim 12, further comprising at least one of:
displaying the graphical user interface on a presentation device; or
transmitting, via a communication interface, the graphical user interface data to a presentation device.

14. The method according to claim 9, wherein the sensor data further identifies motion of the physical toy.

15. The method according to claim 9, wherein the sensor data is received from the physical toy via a communication interface.

16. An interactive system comprising:
a processor;
a physical toy communicatively coupled to the processor, the physical toy comprising;
  a motion sensor configured to detect a motion without reference to the surroundings of the physical real-world toy and to generate motion data based on the motion,
  an environment sensor configured to detect a surrounding environment of the physical toy to generate surroundings data based on the surrounding environment,
  an actuator configured to control a motion of the physical toy in at least one dimension based on a control signal,
  a receiver configured to receive the control signal, and
  a transmitter configured to transmit the motion data and the surroundings data to the processor,
memory coupled to the processor, the memory storing instructions that when executed cause the processor to:
  generate and display a virtual environment of entirely factitious virtual content,
  generate and display a virtual toy in the virtual environment based at least in part on the motion data, the virtual toy representing the physical toy, and
  generate control signals based on modelling of interactions of the virtual toy in the virtual environment performed by a physics engine that uses the motion data and the surrounding data to simulate in the virtual environment corresponding interactions of the physical toy in the surrounding environment in at least one dimension wherein the control signals enable differentiation between the modelling of interactions of the virtual toy in the virtual environment and the motion of the physical toy in at least one dimension; and
a user interface communicatively coupled to the processor, the user interface configured to receive an input to control motion of the virtual toy in the virtual environment.

17. The system of claim 16, wherein the instructions, when executed, further cause the processor to:
move the virtual toy in the virtual environment based on the input received by the user interface,
generate a control signal based on the motion of the virtual toy, and
transmit the control signal to the physical toy, and
wherein the receiver of the physical toy receives the control signal and the actuator moves the physical toy based on the control signal in a dimension corresponding to the movement of the virtual toy in the virtual environment.

18. The system of claim 16, wherein the control signals are operative to reduce a difference between a modelled motion of the virtual toy in the virtual environment and a corresponding motion of the physical toy in the surrounding environment.

19. The system of claim 16, the memory further storing instructions that when executed cause the processor to:
cause presentation of a graphic user interface (GUI) including the virtual toy in the virtual environment.

20. The system of claim 16, wherein the physical toy comprises the physics engine.

21. The physical real-world toy according to claim 1, wherein the interactive software experience receives only sensory data associated with detecting an aspect of the surroundings.

* * * * *